(12) United States Patent
Ha et al.

(10) Patent No.: US 11,371,713 B2
(45) Date of Patent: *Jun. 28, 2022

(54) KNOB ASSEMBLY WITH A DISPLAY DEVICE AND APPLIANCE HAVING THE SAME

(71) Applicant: LG Electronics Inc., Seoul (KR)

(72) Inventors: Yeonsik Ha, Seoul (KR); Hyunggu Lee, Seoul (KR)

(73) Assignee: LG Electionics Inc., Seoul (KR)

( * ) Notice: Subject to any disclaimer, the term of this patent is extended or adjusted under 35 U.S.C. 154(b) by 10 days.

This patent is subject to a terminal disclaimer.

(21) Appl. No.: 17/003,379

(22) Filed: Aug. 26, 2020

(65) Prior Publication Data
US 2020/0393137 A1 Dec. 17, 2020

Related U.S. Application Data

(63) Continuation of application No. 15/900,069, filed on Feb. 20, 2018, now Pat. No. 10,794,597.

(30) Foreign Application Priority Data

Jul. 26, 2017 (KR) ........................ 10-2017-0094805

(51) Int. Cl.
*F24C 3/12* (2006.01)
*F24C 7/08* (2006.01)
(Continued)

(52) U.S. Cl.
CPC .............. *F24C 3/124* (2013.01); *F24C 7/082* (2013.01); *G01D 5/145* (2013.01); *G05G 1/08* (2013.01);
(Continued)

(58) Field of Classification Search
None
See application file for complete search history.

(56) References Cited

U.S. PATENT DOCUMENTS 3,621,158 A 11/1971 Swinstead
9,593,855 B2 3/2017 Moro et al.
(Continued)

FOREIGN PATENT DOCUMENTS

DE 69311108 10/1997
DE 102007046546 4/2009
(Continued)

OTHER PUBLICATIONS

European Search Report in European Application No. 18157481.5, dated Aug. 29, 2018, 8 pages.

*Primary Examiner* — Douglas X Rodriguez
(74) *Attorney, Agent, or Firm* — Fish & Richardson P.C.

(57) ABSTRACT

A knob assembly includes a knob located at a front panel of the knob assembly and configured to rotate about an axis, a knob ring that is located at the front panel, that surrounds the knob, and that rotates about the axis independently of rotation of the knob, an adjusting shaft that extends from the knob through the knob ring in a direction rearward of the front panel and that rotates based on rotation of the knob and causes operation of a device, a first rotation sensing part that senses rotation of the adjusting shaft, and a first sensing target that rotates based on rotation of the adjusting shaft. A position of the first sensing target changes based on rotation of the first sensing target, and the first rotation sensing part senses at least one of the position or a change of the position of the first sensing target.

20 Claims, 15 Drawing Sheets

(51) Int. Cl.
*G05G 1/08* (2006.01)
*G05G 1/10* (2006.01)
*G05G 9/00* (2006.01)
*G05G 5/05* (2006.01)
*G01D 5/14* (2006.01)
*G05G 25/00* (2006.01)

(52) U.S. Cl.
CPC .............. *G05G 1/10* (2013.01); *G05G 9/00* (2013.01); *G05G 25/00* (2013.01); *G05G 5/05* (2013.01)

(56) References Cited

U.S. PATENT DOCUMENTS

| | | | | |
|---|---|---|---|---|
| 2004/0070574 | A1* | 4/2004 | Wylie | F24C 7/082 |
| | | | | 345/184 |
| 2012/0243253 | A1 | 9/2012 | Claprood et al. | |
| 2015/0153048 | A1 | 6/2015 | Moro et al. | |
| 2018/0301301 | A1* | 10/2018 | Bach | H03K 17/97 |

FOREIGN PATENT DOCUMENTS

| | | | | |
|---|---|---|---|---|
| DE | 102009051730 | | 5/2011 | |
| EP | 1881514 | | 1/2008 | |
| EP | 1881514 | A1 * | 1/2008 | ............. H01H 19/14 |
| KR | 100854156 | | 8/2008 | |
| WO | WO2014120858 | | 8/2014 | |

* cited by examiner

KNOB ASSEMBLY WITH A DISPLAY DEVICE AND APPLIANCE HAVING THE SAME

CROSS-REFERENCE TO RELATED APPLICATION

This application is a continuation of U.S. application Ser. No. 15/900,069, filed on Feb. 20, 2018, which claims priority to and the benefit of Korean Patent Application No. 10-2017-0094805, filed on Jul. 26, 2017, the disclosures of which are incorporated herein by reference in their entirety.

FIELD

The present disclosure relates to a knob assembly and an appliance having the same, and more particularly, to a knob assembly used for manipulating an appliance and an appliance having the same.

BACKGROUND

Cooking appliances may be used to cook food, and may be installed in a kitchen space to cook food according to a user's intention. The cooking appliances may be classified in various ways according to, for example, heat sources used therein, forms thereof, and types of fuel.

In classification according to the forms in which food is cooked, cooking appliances may be classified as an open type and a closed type according to the form of space in which food is placed. The closed type cooking appliances may include an oven, a microwave, etc., and the open cooking appliances may include a cooktop, a hob, etc.

The closed type cooking appliances may include a space that is configured to receive food and that is sealed, and the sealed space may be heated to cook food. The open type cooking appliances may include an open space in which food or a container filled with food may be placed, and the food or the food container may be heated to cook food.

The closed type cooking appliances may include a cooking compartment, which is a space being sealed when food placed therein is attempted to be cooked. The cooking compartment may be a space in which food is substantially cooked. A heat source is provided inside or outside the cooking compartment to heat the cooking compartment.

In some examples, complex cooking appliances may include a closed type cooking appliance, an open type cooking appliance, and a plurality of heat sources. For example, the complex cooking appliances may cook various types of food, and a plurality items of food simultaneously.

In some examples of the complex cooking appliance, an open type cooking appliance may be disposed above a closed type cooking appliance. A plurality of heaters or burners may be installed in the open type cooking appliance to allow a plurality of dishes to be cooked simultaneously.

For example, a user may use a closed type cooking appliance for barbecuing, baking, or roasting meat or fish, and may use an open type cooking appliance exposed at the top to cook, for example, by heating a container filled with food.

In some examples, a manipulation part may be provided at a front surface of a cooking appliance. For example, a manipulation part is provided at a portion corresponding to an upper front surface of a cooking appliance, and a plurality of knobs for adjusting heating power may be installed at the manipulation part.

In some examples, a knob may include a knob that allows a rotating manipulation by a user, and a knob ring that surrounds the knob. For instance, the knob may receive a rotating manipulation for adjusting an opening amount of a valve, and the knob ring, which surrounds the knob, may improve an appearance of the knob.

In some examples of a cooking appliance including an oven or a complex cooking appliance, a timer for controlling an operation time of the cooking appliance may be further included in addition to a knob for adjusting heating power.

For example, a timer may be installed in a manipulation part along with a knob, and may include a separate manipulation switch which is independent from the knob.

In some examples of a complex cooking appliance in which a plurality of heat sources are provided, a manipulation part may include numerous knobs. In some cases, when manipulation switches such as a timer are added thereto, the number of components disposed in the manipulation part may increase. In some cases, a user may need to select a knob or a manipulation switch that is suitable for a certain purpose, and may prefer a simple exterior of an appliance.

SUMMARY

One aspect of the present disclosure is to provide a knob assembly including a structure that can improve an appearance of a front surface of an appliance as well as convenience in use, and an appliance having the same.

Another aspect of the present disclosure is to provide a knob assembly that can decrease the number of components, assembling processes, and manufacturing costs and that can provide improved performance of sensing manipulations of manipulation switches such as a knob and a knob ring, and an appliance having the same.

According to one aspect of the subject matter described in this application, a knob assembly includes a knob located at a front panel of the knob assembly and configured to rotate about an axis, a knob ring that is located at the front panel, that surrounds the knob, and that is configured to rotate about the axis independently of rotation of the knob, an adjusting shaft that extends from the knob through the knob ring in a direction rearward of the front panel, the adjusting shaft being configured to rotate based on rotation of the knob and being configured to cause operation of a device, a first rotation sensing part configured to sense rotation of the adjusting shaft, and a first sensing target that is configured to rotate based on rotation of the adjusting shaft. A position of the first sensing target changes based on rotation of the first sensing target, and the first rotation sensing part is further configured to sense at least one of the position of the first sensing target or a change of the position of the first sensing target.

Implementations according to this aspect may include one or more of the following features. For example, the first rotation sensing part may be further configured to sense the position or the change of the position of the first sensing target without contacting the first sensing target. The first sensing target may include a magnetic member configured to generate magnetic force, and the first rotation sensing part may include a Hall sensor configured to sense magnetic force within a distance from the Hall sensor. The first rotation sensing part may include a plurality of Hall sensors that are each configured to generate a signal based on detection of magnetic force and that are arranged at an interval along a rotation path of the first sensing target. The plurality of Hall sensors may include a first Hall sensor located at a first position at the first rotation sensing part, and a second Hall sensor located at a second position that is different from the first position. The first Hall sensor is configured to generate a first type of signal, and the second Hall sensor is configured to generate a second type of signal that is different from the first type of signal.

In some implementations, the knob assembly may further include a second rotation sensing part configured to sense rotation of the knob ring. The knob assembly may further include a second sensing target that is configured to rotate based on rotation of the knob ring. A position of the second sensing target may change based on rotation of the second sensing target, and the second rotation sensing part may be configured to sense at least one of the position or a change of the position of the second sensing target. The second rotation sensing part may be configured to sense the position or the change of the position of the second sensing target without contacting the second sensing target.

In some examples, the second sensing target may include a magnetic member configured to generate magnetic force, and the second rotation sensing part may include a Hall sensor configured to sense magnetic force generated by the magnetic member. The second rotation sensing part may include a plurality of Hall sensors that are each configured to generate a signal based on detection of magnetic force, and that are arranged at an interval along a rotation path of the second sensing target.

In some implementations, the knob assembly may further include a display device that is located at the knob ring. The display device may be configured to output a first result value corresponding to a rotation of the knob sensed by the first rotation sensing part. The knob assembly may further include a second rotation sensing part configured to sense rotation of the knob ring, and the display device may be configured to output at least one of the first result value corresponding to the rotation of the knob or a second result value corresponding to a rotation of the knob ring sensed by the second rotation sensing part. The display device may be configured to alternate output of the first result value and output of the second result value.

According to another aspect of the subject matter, an appliance may include a front panel, and a knob assembly located at the front panel. The knob assembly includes a knob located at a front panel of the knob assembly and configured to rotate about an axis, a knob ring that is located at the front panel, that surrounds the knob, and configured to rotate about the axis independently of rotation of the knob, an adjusting shaft that extends from the knob rearward of the front panel through the knob ring, the adjusting shaft being configured to rotate based on rotation of the knob and being configured to cause operation of a device coupled to the appliance, a first rotation sensing part configured to sense rotation of the adjusting shaft, and a first sensing target configured to rotate based on rotation of the adjusting shaft. A position of the sensing target changes based on rotation of the first sensing target, and the first rotation sensing part is further configured to sense at least one of the position of the first sensing target or a change of the position of the first sensing target.

Implementations according to this aspect may include one or more of the following features as well as one or more of the foregoing features described above in regard to the knob assembly. For example, the first rotation sensing part may be further configured to sense the position or the change of the position of the first sensing target without contacting the first sensing target. The first sensing target may include a magnetic member configured to generate magnetic force, and the first rotation sensing part may include a Hall sensor configured to sense magnetic force within a distance from the Hall sensor.

In some implementations, the knob assembly may further include a second rotation sensing part configured to sense rotation of the knob ring, and a second sensing target configured to rotate based on rotation of the knob ring. A position of the second sensing target changes based on rotation of the second sensing target, and the second rotation sensing part is configured to sense at least one of the position of the second sensing target or a change of the position of the second sensing target. The second rotation sensing part may be configured to sense the position or the change of the position of the second sensing target without contacting the second sensing target. In some examples, the knob assembly may further include a display device that is located at the knob ring and that is configured to output a result value corresponding to at least one of a rotation of the knob or a rotation of the knob ring.

DETAILED DESCRIPTION

Figure 1:
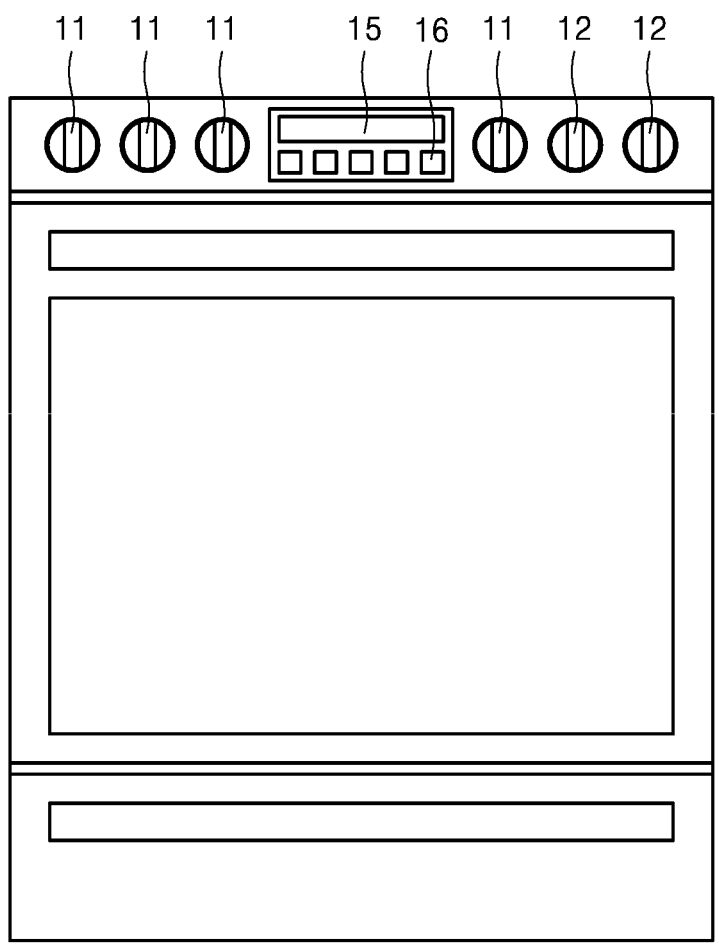
FIG. 1 is a view illustrating an example appliance having an example timer.

Hereinafter, implementations of a knob assembly and an appliance having the same will be described with reference to the accompanying drawings. For convenience of description, thickness of lines or sizes of elements illustrated in the drawings may be exaggerated for clarity of description and convenience. The terms which will be described below are terms defined in consideration of functions in the present disclosure, and may vary according to an intention or practice of a user or operator. Thus, such terms will be defined on the basis of content throughout the present specification.

[Structure of Appliance Having Timer Function]

FIG. 1 illustrates an example appliance having a timer function.

Referring to FIG. 1, an appliance 10 such as a cooking appliance including but not limited to an oven may include a knob 11 located at a front surface for manipulating operation of the appliance, a knob 12 for adjusting time of a timer, a display device 15 for displaying a state of the appliance, and a switch 16 for separate manipulation.

An appliance such as a cooking appliance having an oven often may operate for a long operation time. In some examples, a timer for setting an operation time may be installed in the appliance.

The knob 11 for adjusting heating power, a rotational speed, a strength of operation, and the like and the knob 12 for adjusting time of a timer may be provided as separate switches having different shapes or operated by different methods. In some examples, for unity of design and convenience of manipulation, the knobs 11 and 12 may be provided as a plurality of rotary switches having the same type.

In some examples, the display device 15 may display a manipulation state or the like of an appliance. For example, a cooking appliance may display, on the display device 15, information including but not limited to an output (e.g., temperature) of a burner, time of a timer, a cooking mode of an automatic cooking function, or the like.

In some examples, as the number of heating elements having a timer function increases, the number of timer handles may also increase as a consequence. In some cases, the shape of the front surface of the appliance may become complicated, and an appearance of the front surface may be degraded.

In some examples, the knob 11 for manipulating operation of the appliance and the knob 12 for adjusting time of a timer are provided as switches of the same type. In some cases, a user may find it difficult to intuitively recognize which function is performed by which knob in the design, and a convenience level in use is may be decreased.

The present disclosure provides a knob assembly with an improved structure to improve an appearance of a front surface of an appliance as well as to provide improved convenience in use, and appliance having the same.

Hereinafter, each element of the knob assembly according to one implementation of the present disclosure will be described. Here, the case in which the appliance is a cooking appliance will be described as an example. However, the appliance of the present disclosure is not limited thereto, and in addition to the cooking appliance, may include any appliance in the form in which both a knob for manipulating operation of an appliance such as a heater for heating and a dish washer and a timer for adjusting an operation time of the appliance are disposed.

[Structure of Knob]

Figure 2:
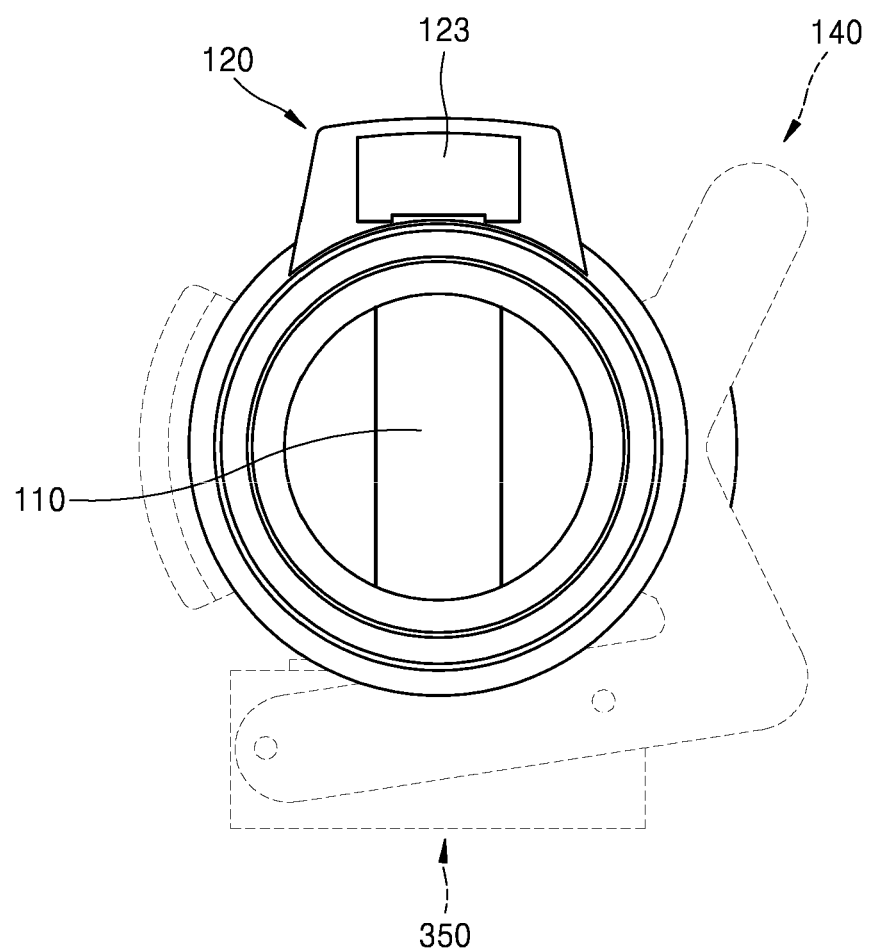
FIG. 2 is a front view illustrating a front surface of an example knob assembly.
Figure 3:
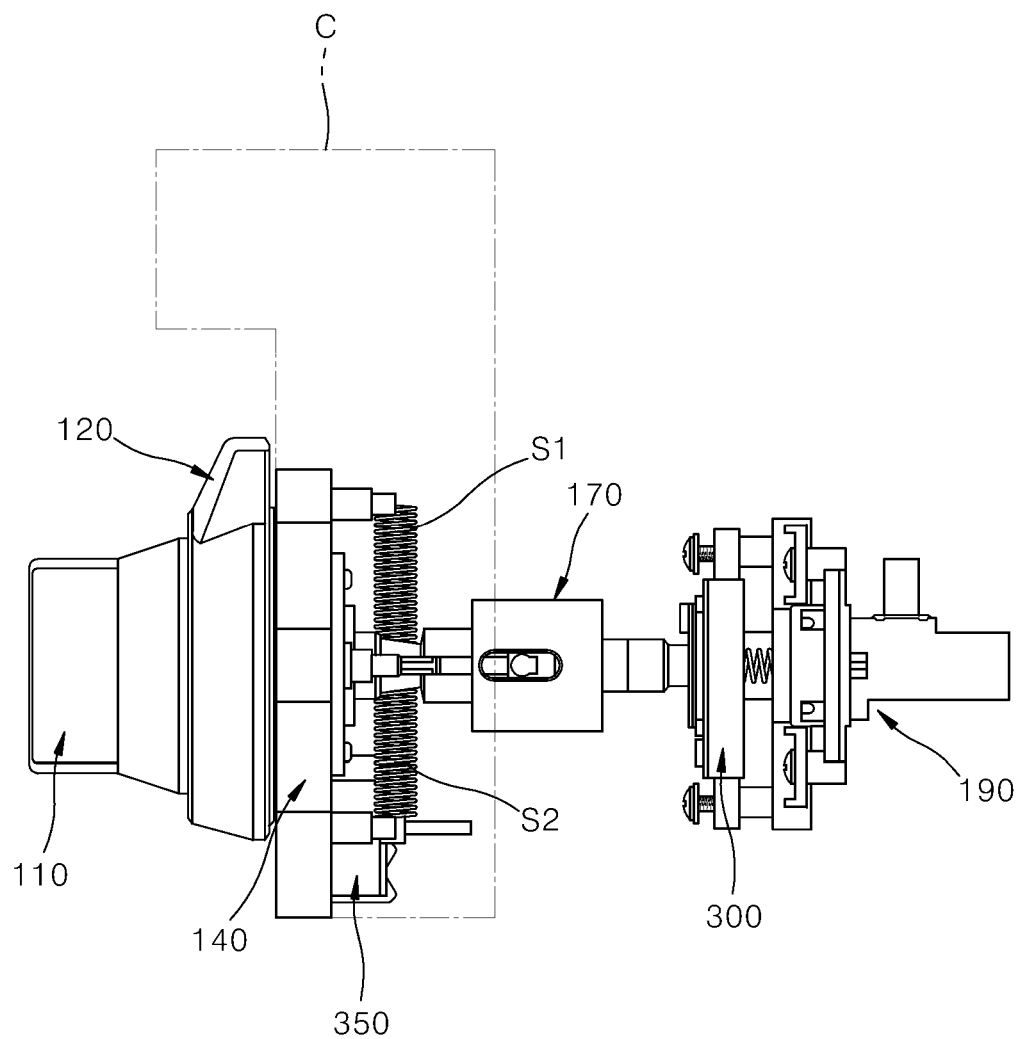
FIG. 3 is a side view illustrating an example coupling state of the knob assembly.
Figure 4:
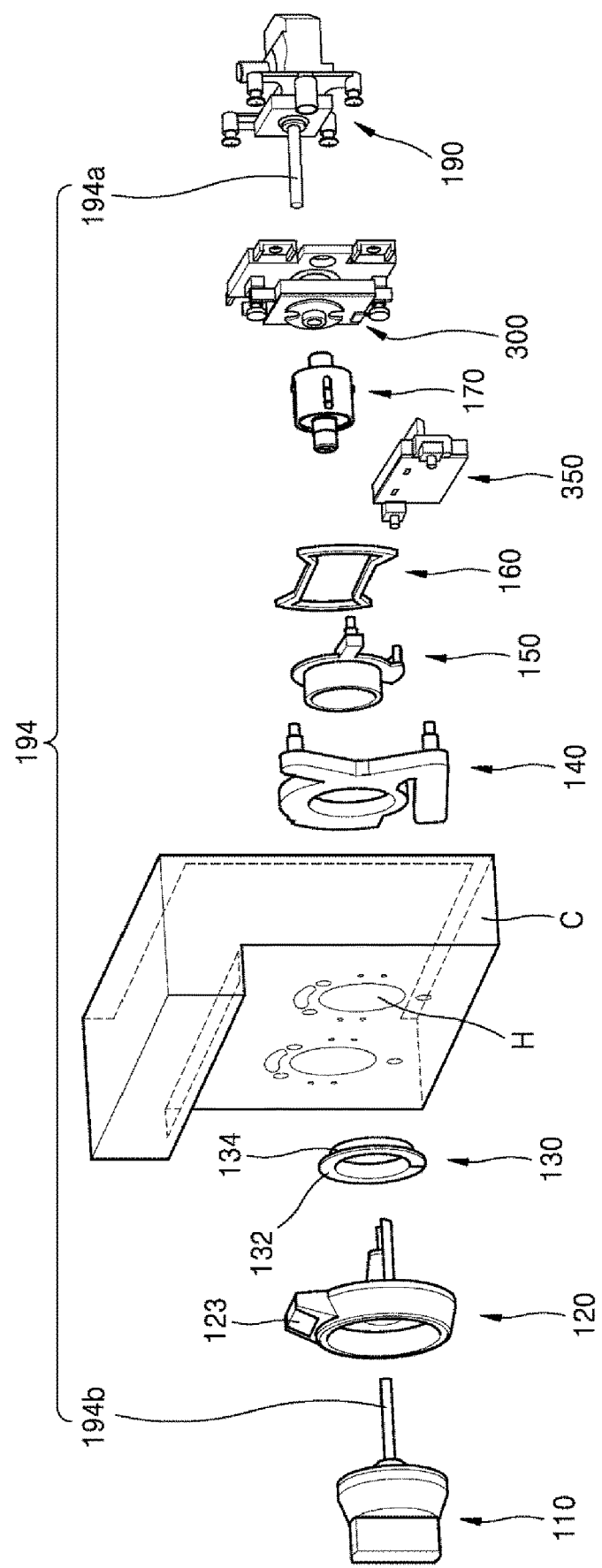
FIG. 4 is an exploded perspective view illustrating the knob assembly.
Figure 5:
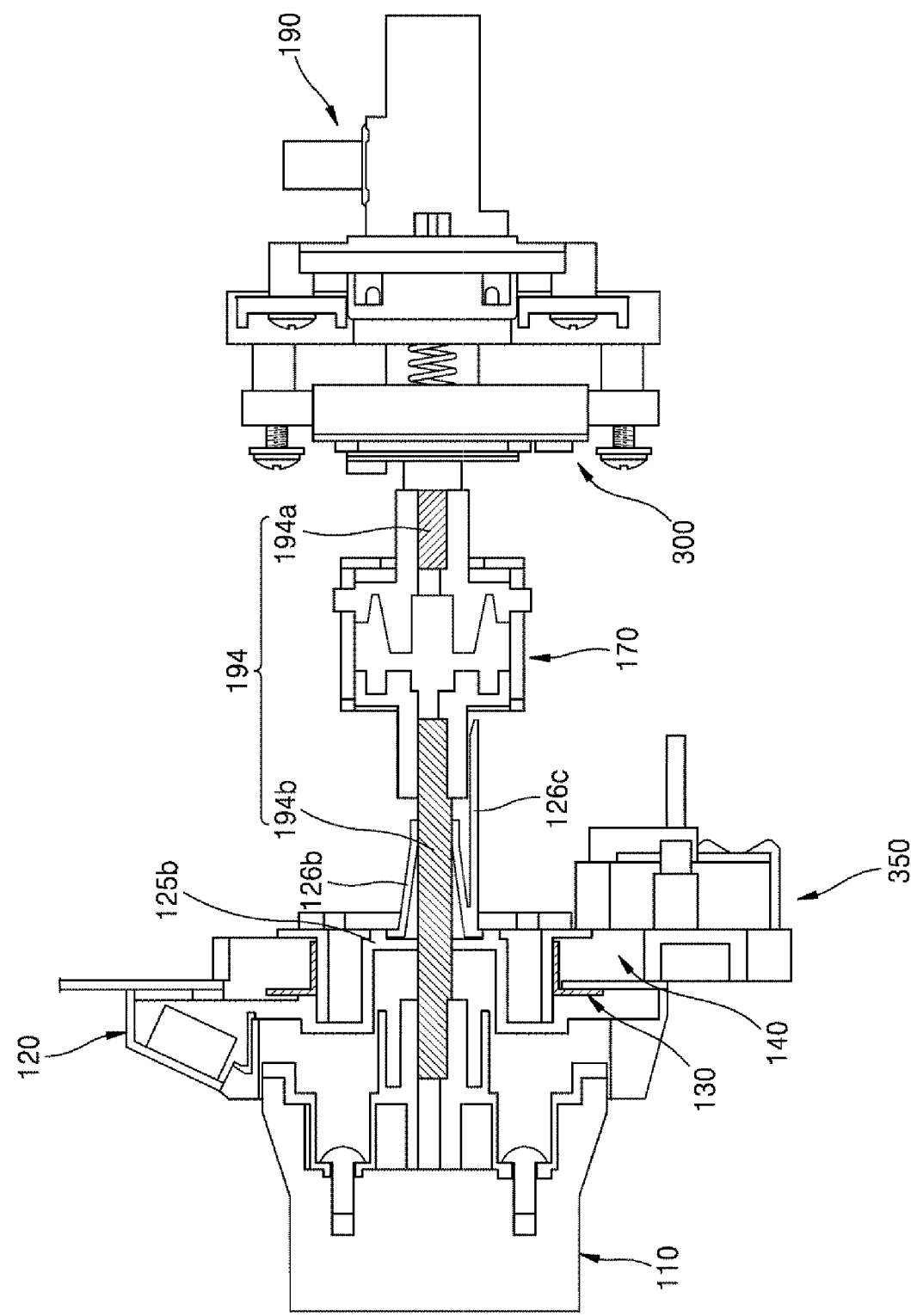
FIG. 5 is a cross-sectional view illustrating a cross-section of the coupling state of the knob assembly.

FIG. 2 is a front view illustrating a front surface of an example knob assembly according to one implementation of the present disclosure, and FIG. 3 is a side view illustrating an example coupling state of the knob assembly. FIG. 4 is an exploded perspective view illustrating an exploded state of the knob assembly, and FIG. 5 is a cross-sectional view illustrating a cross-section of the coupling state of the knob assembly.

Referring to FIGS. 2 to 5, a knob 110 is connected to a valve shaft 194a of a valve assembly 190 configured to adjust heating power.

In some implementations, the knob 110 may be a no-return type rotary switch, for instance. The knob 110 may maintain a position without change after a user rotates the knob 110, and an output of a corresponding heating element may be recognized according to an angle at which the knob 110 is rotated.

For example, in the case of a gas burner, a valve assembly 190 is a valve configured to adjust a gas supply amount, and in the case of an electric stove or an induction stove, the valve assembly 190 is an output adjusting devices (e.g., a variable resistor) configured to adjust an output.

As described above, the knob 110 is connected to the valve shaft 194a of the valve assembly 190. In some examples, a knob assembly structure of a cooking appliance may include the knob 110 that is directly coupled to a valve shaft. In some examples where the knob 110 is directly coupled to the valve shaft 194a, a misalignment due to tolerance or the like of the valve shaft 194a may be directly transferred to the knob 110, and accordingly, a problem in which the knob 110 and a knob ring 120 are misaligned occurs.

In some implementations, the knob assembly may include a structure in which a knob shaft 194b is coupled to the knob 110 instead of the knob 110 being directly coupled to the valve shaft 194a, and a universal joint 170 may connect the knob shaft 194b to the valve shaft 194a.

The universal joint 170 may absorb a position error of the valve shaft 194a between the knob shaft 194b and the valve shaft 194a, and may perform an operation of transferring a rotating operation and a pressing operation of the knob 110 to the valve shaft 194a.

Hereinafter, a shaft connection body, which is formed by connection between the valve shaft 194a of the valve assembly 190 and the knob shaft 194b coupled to the knob 110, will be referred to as an adjusting shaft 194.

In some implementations, the knob 110 may include a protruding handle portion having a circular shape. In the present implementation, although the handle portion protrudes in a bar shape as an example, the handle portion may have various other shapes.

In some implementations, the knob 110 may be manufactured with a synthetic resin injection material or manufactured by processing a metal material. The material and shape of the knob 110 may be changed in various ways.

[Structure of Knob Ring]

The knob ring 120 is a component disposed at an outer peripheral surface of the knob 110 to improve an exterior around the knob 110.

In some implementations, the knob ring 120 may support the knob 110 and may improve quality of an exterior of the cooking appliance by finishing an exterior of the knob 110.

The knob ring 120 may be disposed to serve as a timer manipulating switch and a display configured to display time of a timer and a level of heating power.

In some implementations, the knob ring 120 may be installed to be rotatable independently of rotation of the knob 110, and the time of the timer may be set by rotating the knob ring 120. A display device 123 is disposed at the knob ring 120, and the time of the timer and the level of heating power may be displayed through the display device 123.

For example, a first rotation sensing part 300 configured to sense a rotation amount of the knob 110 and a second rotation sensing part 350 configured to sense a rotation amount of the knob ring 120 are disposed in the knob assembly of the present implementation. The first rotation sensing part 300 senses a rotation amount of the adjusting shaft 194 connected to the knob 110. The second rotation sensing part 350 senses rotation of an actuating ring 150 connected to the knob ring 120.

The knob 110 and the knob ring 120 may be installed to be exposed to the outside of a front panel C of a cooking appliance, and heating power, time of a timer, and the like may be displayed on the display device 123 disposed at the knob ring 120.

The heating power level displayed on the display device 123 may be a value calculated on the basis of a value of a sensed rotation amount of the knob 110, and the time of the timer displayed on the display device 123 may be a value calculated on the basis of a value of a sensed rotation amount of the knob ring 120.

The display device 123 may include a heating power-displaying portion and a timer time-displaying portion that is separate from the heating power-displaying portion. In some implementations, a heating power level or a timer time may be selectively displayed on the display device 123.

For example, the display device 123 may be operated such that only a heating power level is fundamentally displayed when a timer is not set, and a heating power level is displayed for a predetermined amount of time and then a timer time is displayed for a predetermined amount of time when the timer is set.

In some examples, a color of light when a heating power level is displayed and a color of light when a timer time is displayed may be made different so that a user may easily recognize which of the heating power and the timer time a displayed number is indicating.

For example, the heating power may be displayed with a red color, and the timer time may be displayed with a white (or blue) color. When both the heating power level and the timer time are displayed, the heating power level may be displayed for 2 seconds and then the timer time may be displayed for the next 2 seconds, for instance.

As described above, both the heating power level and the timer time may be displayed through the knob assembly. In this way, information necessary for using a cooking appliance may be effectively provided to a user without a separate display being installed at the front panel C.

[Structure of Actuating Ring]

The actuating ring 150 is coupled to a rear surface of the knob ring 120 and is disposed to integrally rotate with the knob ring 120. In this case, a rotation amount of the actuating ring 150 and a rotation amount of the knob ring 120 are the same, and therefore, manipulation of the knob ring 120 may be sensed by sensing the rotation amount of the actuating ring 150.

In some examples, a knob ring gear part G2 may be disposed at the actuating ring 150.

For example, the actuating ring 150 may include a coupling shaft part 151, a flange part 152, and a wing part 153.

The coupling shaft part 151 is a portion that passes through a support frame 140 and is supported to be rotatable by the support frame 140. The coupling shaft part 151 may be formed in the shape of a circular tube, and a space through which the adjusting shaft 194 may pass is formed inside the coupling shaft part 151. The coupling shaft part 151 may be coupled to the knob ring 120 via the front panel C and the support frame 140, and in this way, coupling that allows the actuating ring 150 to be integrally rotated with the knob ring 120 is performed.

The flange part 152 is formed in the shape of a flange protruding from a rear end of the coupling shaft part 151 outward in a diametric direction of the coupling shaft part 151. In this example, a direction toward the outside of the front panel C with respect to the front panel C will be referred to as the front, and a direction toward the valve assembly 190 will be referred to as the rear.

Based on a flat surface coming into contact with the support frame 140 behind the support frame 140, the flange part 152 may prevent deviation of the actuating ring 150 toward the front and allow the actuating ring 150 to be stably rotated without swinging in front and rear directions.

The wing part 153 is formed to protrude from an outer peripheral surface of the coupling shaft part 151 outward in the diametric direction of the coupling shaft part 151. Unlike the flange part 152 formed in the shape of a disc that surrounds the coupling shaft part 151, the wing part 153 is formed in the shape of a bar extending outward in the diametric direction of the coupling shaft part 151.

The wing part 153 is inserted into a fixing frame 160. The wing part 153 may move within a movement-possible region inside the fixing frame 160, and movement thereof is limited from a point interfering with an upper inner wall or a lower inner wall of the fixing frame 160.

When the movement range of the wing part 153 is limited by the fixing frame 160 as above, an angle of rotation in both directions of the actuating ring 150 may be limited to a predetermined range. The wing part 153 is also a coupling portion between elastic members S1 and S2 which will be described above and the actuating ring 150.

[Structure of Support Frame]

The support frame 140 is coupled to the front panel C and serves to support the knob ring 120. The knob 110 and the knob ring 120 are coupled to aligned positions of the front panel C, and the front panel C is formed of a metal thin plate. Therefore, when a hole is formed in the front panel C, and the knob ring 120 is rotated by being directly rubbed against the hole, a problem in which the knob ring 120 is cut due to the front panel C may occur.

In consideration of such an aspect, in the present implementation, a structure in which the support frame 140 is installed behind a hole H formed in the front panel C, and the knob ring 120 is rotated while the knob ring 120 is supported by the support frame 140 installed as above so that generation of friction between the knob ring 120 and the front panel C during rotation of the knob ring 120 is suppressed is provided.

According to the present implementation, the support frame 140 includes a frame main body part 141, a through-hole 143, and a support part 145.

The frame main body part 141 forms a frame of the support frame 140 and is coupled to the front frame C to be disposed behind the front panel C.

The through-hole 143 corresponding to an outer diameter of the actuating ring 150 coupled to the knob ring 120 is formed to pass through an inner side of the frame main body part 141. The through-hole 143 forms a path for the coupling shaft part 151 of the actuating ring 150 to pass through the support frame 140 in the front and rear directions.

The support part 145 forming a sidewall configured to support the coupling shaft part 151 to be rotatable around the through-hole 143 is formed outside the through-hole 143. The actuating ring 150 is seated on the support part 145 disposed as above, and accordingly, the actuating ring 150 is supported by the support frame 140 to be rotated at a predetermined position.

The knob ring 120 coupled to such an actuating ring 150 is supported to be rotated about a predetermined axis on the support frame 140 by a support structure between the support frame 140 and the actuating ring 150 formed as above.

In other words, because a position of the knob ring 120 is determined by the support frame 140, and the support frame 140 is fastened to the front panel C, the position of the knob ring 120 may be fixed with respect to the front panel C.

As described above, the support frame 140 surrounds the outer peripheral surface of the actuating ring 150 and serves to support the actuating ring 150 to be rotatable about the predetermined axis.

The support frame 140 is coupled to a guide rod 210 disposed at a burner frame 200 to which the valve assembly 190 is fixed.

The guide rod 210 is provided for fixing between the burner frame 200 and the support frame 140, and the support frame 140 coupled to the guide rod 210 may be fixed to a predetermined position with respect to the burner frame 200.

[Structure of Fixing Frame]

The fixing frame 160 is provided to prevent the actuating ring 150 from being deviated rearward (toward the inside of the appliance) from the fixing frame 160, is installed at a rear side of the front panel C, and is fastened and fixed to the support frame 140 by a fastening object such as a screw.

The fixing frame 160 also serves to restrict the range of rotation of the actuating ring 150. The fixing frame 160 limits rotations of the actuating ring 150 and the knob ring 120 so that the actuating ring 150 and the knob ring 120 are rotatable in left and right directions only within a predetermined angle range.

The fixing frame 160 is formed in the shape similar to that of a bow tie. In the fixing frame 160, portions corresponding to wings of a bow are portions configured to limit rotation of the actuating ring 150 so that the actuating ring 150 is rotatable only within a predetermined angle range, and a portion connecting the both wings is a portion configured to prevent deviation of the actuating ring 150 toward the rear.

According to the present implementation, the fixing frame 160 may include a fixing part 161 and a wing insertion part 163.

The fixing part 161 is coupled to the support frame 140 and supports the actuating ring 150. The fixing part 161 corresponds to a portion connecting the both wings in the fixing frame 160 formed in the shape similar to that of a bow tie.

For example, the fixing part 161 is disposed at a rear side of the flange part 152 of the actuating ring 150 and is coupled to the frame main body part 141, while the flange part 152 is disposed therebetween, to support the actuating ring 150 in a direction in which the flange part 152 and the wing part 153 is adhered to the frame main body part 141.

In this way, a position of the actuating ring 150 in the front and rear directions is restricted in the form in which a front side of the flange part 152 is supported by the support frame 140, and a rear side of the flange part 152 is supported by the fixing frame 160. The actuating ring 150 may be rotated at a predetermined position while the position thereof in the front and rear directions is restricted as above, and in this way, the actuating ring 150 may stably fix a rotary position of the knob ring 120.

The wing insertion part 163 is disposed at each of both sides in a side direction of the fixing part 161. The wing insertion parts 163 correspond to portions corresponding to the wings of the bow in the fixing frame 160 formed in the shape similar to that of a bow tie.

In each of the wing insertion part 163, the wing part 153 of the actuating ring 150 is inserted to be rotated within a predetermined angle range. That is, the wing part 153 inserted into the wing insertion part 163 may move within a movement-possible region inside the wing insertion part 163, and movement thereof is limited from a point interfering with an upper inner wall or a lower inner wall of the wing insertion part 163.

When the movement range of the wing part 153 is limited by the wing insertion part 163 as above, an angle of rotation in both directions of the actuating ring 150 may be limited to a predetermined range.

[Structure of Bearing Shell]

A bearing shell 130 is a configuration that serves as a bearing that facilitates manipulation of the knob ring 120.

The bearing shell 130 may include a cylindrical part 134 formed in a cylindrical shape and a disc part 132 bent from the cylindrical part 134 and protruding in a radial direction.

The cylindrical part 134 is inserted between the outer peripheral surface of the actuating ring 150 coupled to the knob ring 120 and an inner peripheral surface of the fixing frame 160. The cylindrical part 134 serves to reduce friction between the actuating ring 150 and the fixing frame 160.

The disc part 132 is inserted between the front panel C and the knob ring 120. The disc part 132 serves to reduce friction between the knob ring 120 and the front panel C. The disc part 132 may also cause the knob ring 120 to be spaced apart from the front panel C at a predetermined interval to suppress the front panel C from being scratched due to the knob ring 120 coming into contact with the front panel C during manipulation of the knob ring 120.

[Structure of Elastic Member]

According to the present implementation, the knob ring 120 is provided in the form in which a return-type manipulation is possible. For example, the knob ring 120 is provided in the form in which the knob ring 120 is manipulated to be rotatable within a predetermined angle range clockwise or counterclockwise and then is returned to its original position when an external force is released.

The elastic members S1 and S2 provide a restoration force for returning the knob ring 120 to an initial position. Such elastic members S1 and S2 may include a first elastic member S1 configured to provide a restoration force clockwise and a second elastic member S2 configured to provide a restoration force counterclockwise.

In some implementations, each of the elastic members S1 and S2 is in the form of a coil spring having one longitudinal side fixed to the actuating ring 150 and the other longitudinal side fixed to the support frame 140.

According to this, wing-side coupling parts 155 to which the one longitudinal sides of the elastic members S1 and S2 are coupled are provided at respective wing parts 153 of the actuating ring 150, and frame-side coupling parts 147 and 148 to which the other longitudinal sides of the elastic members S1 and S2 are coupled are provided at respective frame main body parts 141 of the support frame 140.

In some implementations, the wing-side coupling parts 155 and the frame-side coupling parts 147 and 148 are provided in shapes of protrusions protruding from the respective wing parts 153 or frame main body parts 141. The elastic members S1 and S2 may be fixed by hook portions respectively provided at the both longitudinal sides of the elastic members S1 and S2 being hooked to the wing-side coupling parts 155 and the frame-side coupling parts 147 and 148.

Further, the frame-side coupling parts 147 and 148 may include a first frame-side coupling part 147 disposed above the wing-side coupling parts 155 and having the first elastic member S1 coupled thereto, and a second frame-side coupling part 148 disposed below the wing-side coupling parts 155 and having the second elastic member S2 coupled thereto.

That is, the first elastic member S1 is installed in the form in which one longitudinal side thereof is coupled to the wing-side coupling part 155 and the other longitudinal side thereof is coupled to the first frame-side coupling part 147. The second elastic member S2 is installed in the form in which one longitudinal side thereof is coupled to the other wing-side coupling part 155 and the other longitudinal side thereof is coupled to the second frame-side coupling part 148.

When an external force is not applied, elastic forces of the first elastic member S1 and the second elastic member S2 installed as above are balanced, and accordingly, the knob ring 120 is maintained at an initial position.

Because the actuating ring 150 and the knob ring 120 are integrally rotated, the knob ring 120 is maintained at an initial position due to the elastic forces of the elastic members S1 and S2 connected to the actuating ring 150. The knob ring 120 maintained at the initial position as above may be rotated at a predetermined angle clockwise or counterclockwise, and when an external force is released while the knob ring 120 is rotated, the knob ring 120 may be returned to its original position due to restoration forces provided by the elastic members S1 and S2.

For example, when the knob ring 120 is manipulated counterclockwise, the first elastic member S1 elongated due to rotation of the knob ring 120 may provide a restoration force for returning the knob ring 120 to its original position. i.e., the initial position, and when the knob ring 120 is manipulated clockwise, the second elastic member S2 elongated due to rotation of the knob ring 120 may provide a restoration force for returning the knob ring 120 to the initial position.

[Detailed Structure of Knob Ring]

Figure 6:
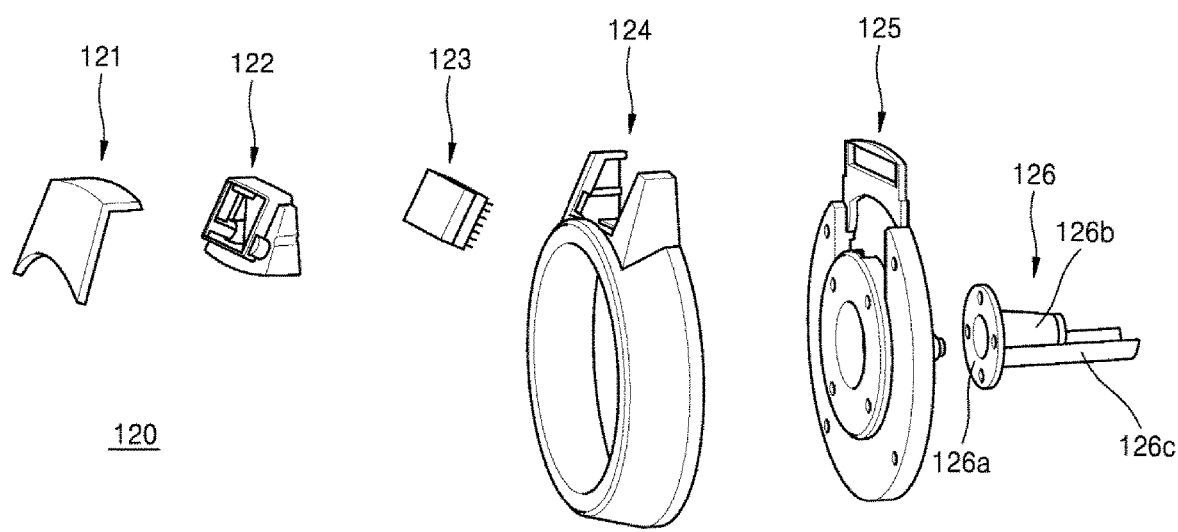
FIG. 6 is an exploded perspective view illustrating an example knob ring.
Figure 7:
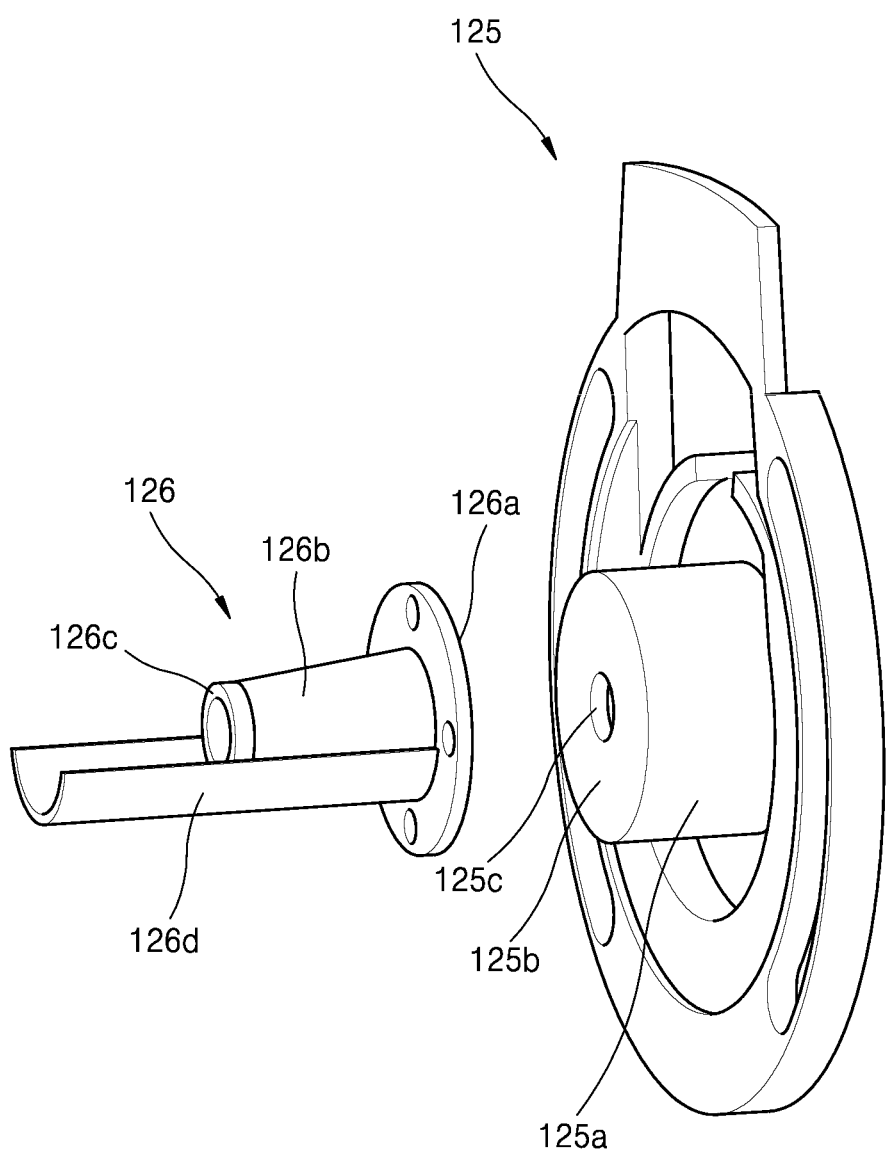
FIG. 7 is a rear perspective view illustrating rear surfaces of example components of the knob ring illustrated in FIG. 6.

FIG. 6 is an exploded perspective view illustrating an exploded state of an example knob ring, and FIG. 7 is a rear perspective view illustrating rear surfaces of some components of the knob ring illustrated in FIG. 6.

Referring to FIGS. 6 and 7, a knob ring 120 may include a knob ring main body 124, a rear plate 125, and a support tube 126.

The knob ring main body 124 forms an exterior of the knob ring 120. In some examples, the knob ring main body 124 is formed in a shape including a ring shape.

The rear plate 125 is formed in a shape including a disc shape and is coupled to a rear surface of the knob ring main body 124. The rear plate 125 includes a support plate 125b that enters the front panel C (see FIG. 3) and protrudes toward an inner portion of the cooking appliance. Further, a support hole 125c configured to form a path for the adjusting shaft 194 (see FIG. 3) to pass through the knob ring 120, and support the adjusting shaft 194 is disposed in the support plate 125b.

The support tube 126 provided to support the adjusting shaft 194 is coupled to the rear plate 125. The support tube 126 may include a flange 126a coupled to the rear plate 125, a tapered tube 126b extending from the flange 126a, and a support rib 126d extending more than the tapered tube 126b.

The tapered tube 126b has a tapered shape in which a diameter narrows away from the flange 126a, and includes a support part 126c disposed at an end thereof and configured to support the adjusting shaft 194.

In the knob ring 120 including the above-described configurations, a two-point support structure in which the adjusting shaft 194 is supported at the support hole 125c and the support part 126c is provided.

In the present implementation, because the adjusting shaft 194 is installed to be movable by a universal joint instead of being restricted to a predetermined position as in the related art, a structure capable of stably supporting the adjusting shaft 194 is necessary.

For this, in the present implementation, the two-point support structure in which the adjusting shaft 194 is supported at the support hole 125c and the support part 126c is provided by the knob ring 120 such that the adjusting shaft 194 may be stably supported.

In addition to the support structure configured to support the adjusting shaft 194 at two or more points, the knob ring 120 may also provide a support structure capable of supporting a front end of a gear part G1 (see FIG. 4) coupled to the adjusting shaft 194.

In the present implementation, a display device 123 capable of displaying a heating power level or a timer time is disposed at the knob ring 120. The display device 123 is coupled to the knob ring main body 124 via a display housing 122, and a finishing cap 121 is coupled to an outer portion of the display device 123. The finishing cap 121 may be made of a transparent or translucent material to allow information (e.g., a number) displayed on the display device 123 to be viewed from the outside.

Figure 8:
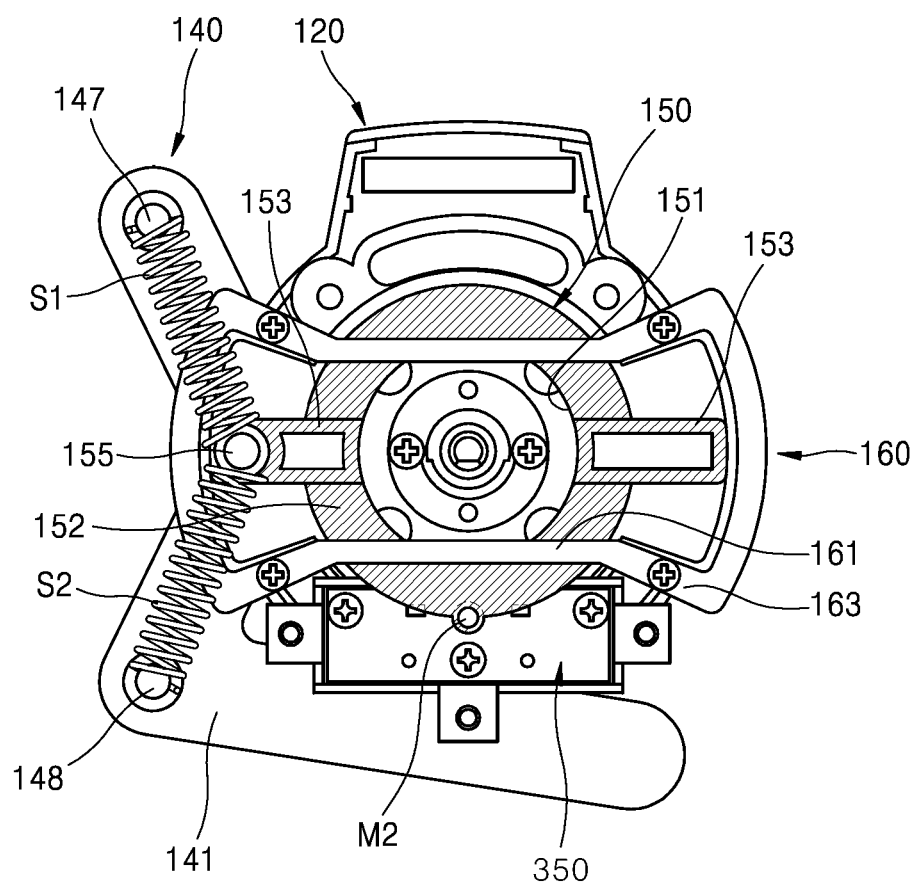
FIG. 8 is a rear view illustrating an example assembly structure of the knob assembly.
Figure 9:
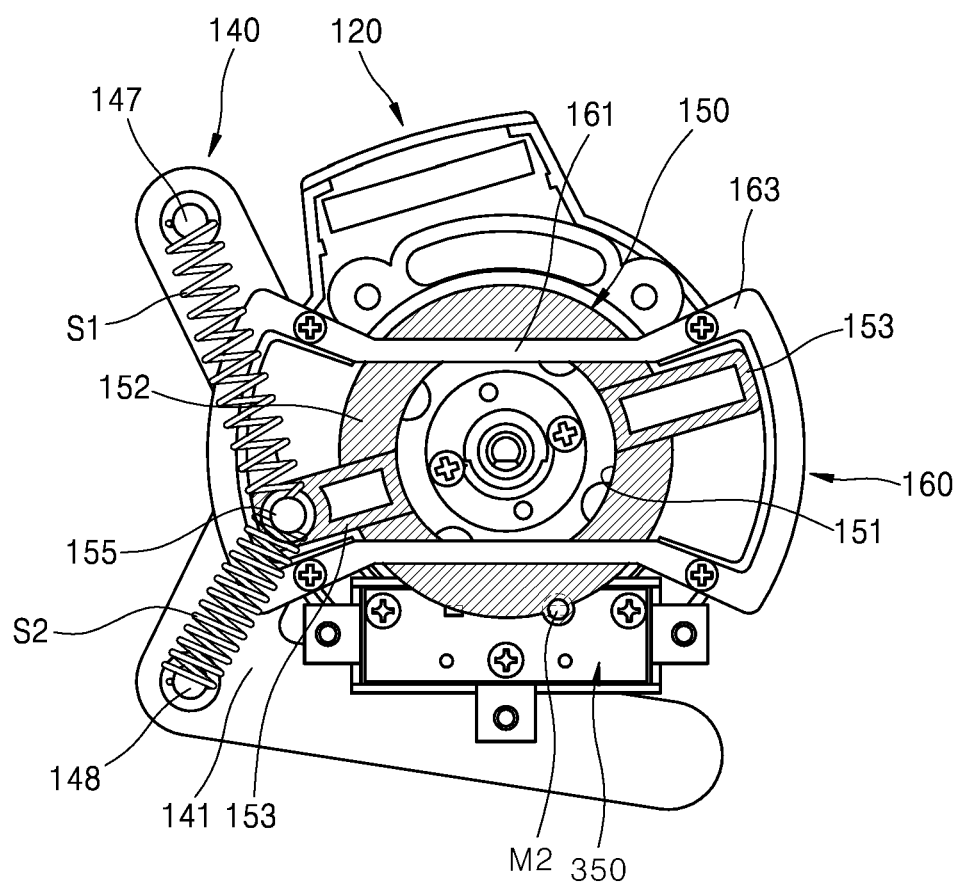
FIG. 9 is a view illustrating an example manipulation state in which the knob ring of the knob assembly illustrated in FIG. 8 is rotated counterclockwise.
Figure 10:
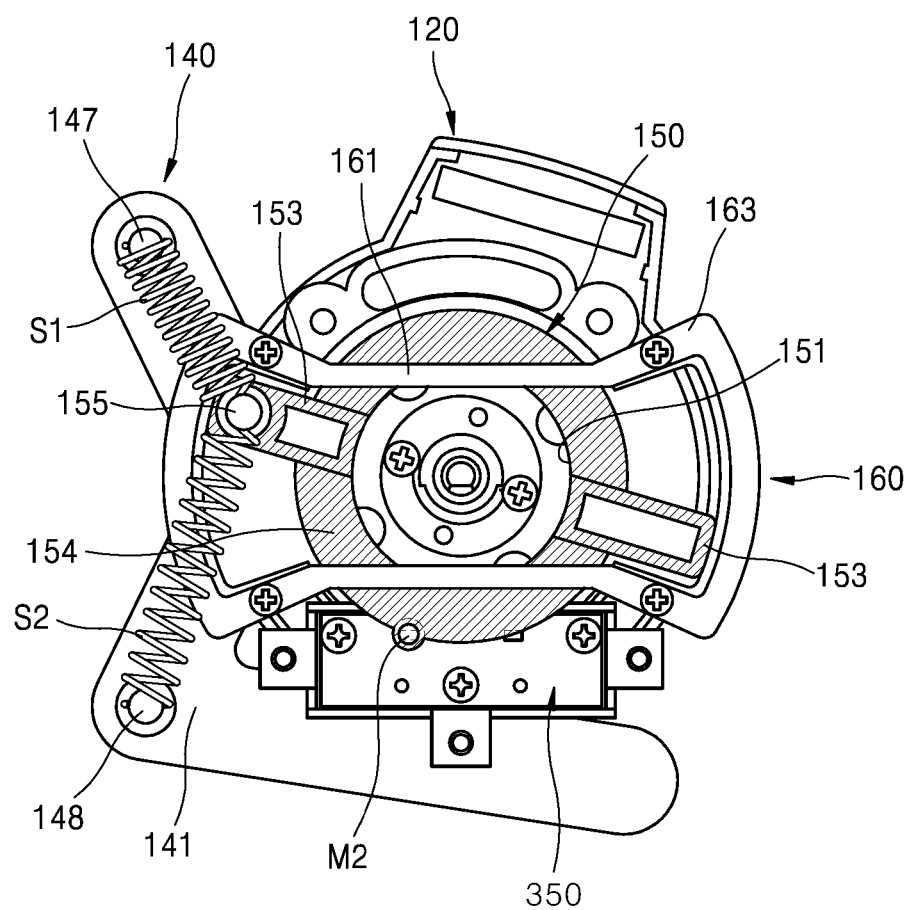
FIG. 10 is a view illustrating an example manipulation state in which the knob ring of the knob assembly illustrated in FIG. 8 is rotated clockwise.

FIG. 8 is a rear view showing an assembly structure of the knob assembly according to one implementation of the present disclosure, FIG. 9 is a view illustrating a manipulation state in which a knob ring of the knob assembly illustrated in FIG. 8 is rotated counterclockwise, and FIG. 10 is a view illustrating a manipulation state in which the knob ring of the knob assembly illustrated in FIG. 8 is rotated clockwise.

For convenience of illustration, the front panel is omitted in FIGS. 8 to 10.

Referring to FIGS. 3 and 8, the knob 110 and the knob ring 120 are coupled to the front side of the front panel, and the support frame 140, the actuating ring 150, and the fixing frame 160 are coupled to the rear side of the front panel.

The fixing frame 160 is fastened to the rear surface of the front panel C, and the actuating ring 150 is fastened to the knob ring 120 via the front panel. In this case, the center of rotation of the actuating ring 150 coincides with the center of rotation of the knob 110. The actuating ring 150 serves to restrict the center of rotation of the knob 110 to be at a regular position with respect to the front panel C. That is, when the actuating ring 150 is fixed at a regular position with respect to the front panel, by this, the knob 110 may be fixed at an accurate position with respect to the front panel C.

The actuating ring 150 is inserted into the support frame 140, and a portion thereof passes through the front panel and protrudes from the front surface of the front panel. A front end of the actuating ring 150 is formed in a cylindrical shape, and the cylindrical portion protrudes from the front surface of the front panel C.

The knob ring 120 is coupled to the cylindrical portion of the actuating ring 150 protruding from the front surface of the front panel C. By the knob ring 120 being coupled to the actuating ring 150 supported by the support frame 140, a support structure in which the knob ring 120 is supported by the support frame 140 is formed as a result.

Manipulation of the knob ring 120 may be recognized by rotation of the actuating ring 150, which is rotated by being interlocked with rotation of the knob ring 120. Since the knob ring 120 is a portion exposed to the outside of the front panel C, it is not desirable in terms of appearance for the second rotation sensing part 350, which is configured to sense manipulation of the knob ring 120, to be installed around the knob ring 120 outside the front panel.

In consideration of such an aspect, in the present implementation, the second rotation sensing part 350 is installed around the actuating ring 150, which is the inside of the front panel, and the second rotation sensing part 350 installed as above may sense rotation of the knob ring 120 by sensing rotation of the actuating ring 150 inside the front panel.

In a knob assembly structure of the present implementation, a fixing frame 160 configured to prevent the actuating ring 150 from being deviated to a rear surface and allow the actuating ring 150 to be stably operated is included.

The fixing frame 160 is disposed to cross the rear surface of the actuating ring 150 and be fixed to the support frame 140. The fixing frame 160 serves to prevent the actuating ring 150 from being deviated to the rear surface and limit a rotation range of the actuating ring 150 within a designated range.

According to the present implementation, the actuating ring 150 includes a wing part 153 formed to extend sideward from the center of the actuating ring 150, and the wing part 153 is inserted into the fixing frame 160.

The wing part 153 inserted into the fixing frame 160 as above may move within a movement-possible region inside the fixing frame 160, and movement thereof is limited from a point interfering with an upper inner wall or a lower inner wall of the fixing frame 160.

When the movement range of the wing part 153 is limited by the fixing frame 160 as above, an angle of rotation in both directions of the actuating ring 150 may be limited to a predetermined range.

By applying a structure in which the wing part 153 is disposed at each of both sides of the actuating ring 150, and movement ranges of the wing parts 153 are limited at the same position, the rotation range of the actuating ring 150 may be more stably limited.

The actuating ring 150 is connected to a pair of elastic members S1 and S2 configured to provide an elastic force for returning the actuating ring 150, which is rotated to a position spaced apart from an initial position, to the initial position.

Because the actuating ring 150 and the knob ring 120 are integrally rotated, the knob ring 120 is maintained at an initial position due to elastic forces of the elastic members S1 and S2 connected to the actuating ring 150. The knob ring 120 maintained at the initial position as above may be rotated at a predetermined angle clockwise or counterclockwise, and when an external force is released while the knob ring 120 is rotated, the knob ring 120 may be returned to the initial position due to restoration forces provided by the elastic members S1 and S2.

For example, when the actuating ring 150 is rotated counterclockwise due to manipulation of the knob ring 120 as illustrated in FIG. 9, the first elastic member S1 of the pair of elastic members S1 and S2 provides an elastic force acting clockwise for the actuating ring 150 to be returned to an initial position. When the actuating ring 150 is rotated clockwise due to manipulation of the knob ring 120 as illustrated in FIG. 10, the second elastic member S2, which is the other one of the pair of elastic members S1 and S2, provides an elastic force acting counterclockwise for the actuating ring 150 to be returned to the initial position.

[Structures of First Sensing Object and First Rotation Sensing Part]

Figure 11:
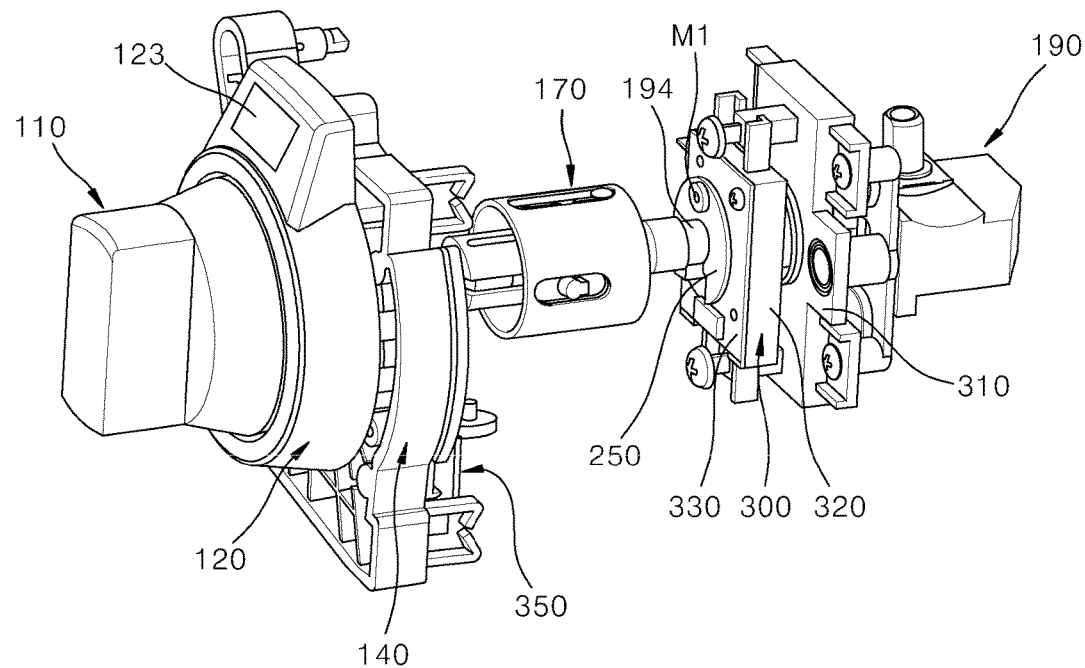
FIG. 11 is a perspective view illustrating a portion of an example knob assembly.
Figure 12:
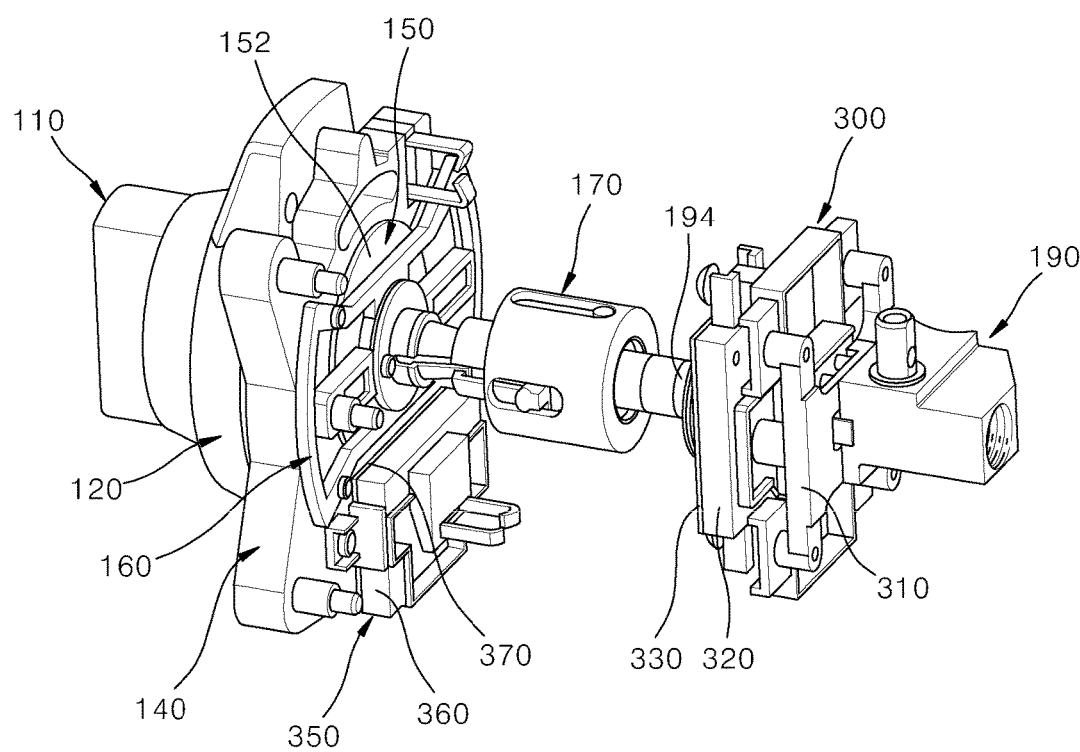
FIG. 12 is a perspective view illustrating the knob assembly illustrated in FIG. 11 in a different direction.
Figure 13:
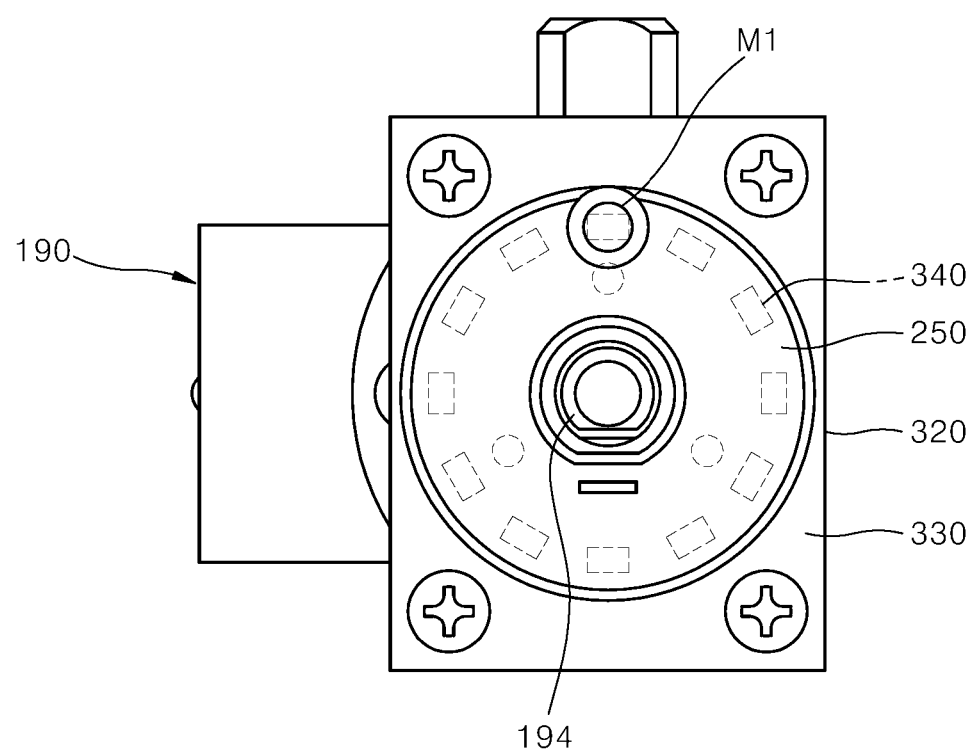
FIG. 13 is a schematic view illustrating an example configuration of an example first sensing object and an example first rotation sensing part.
Figure 14:
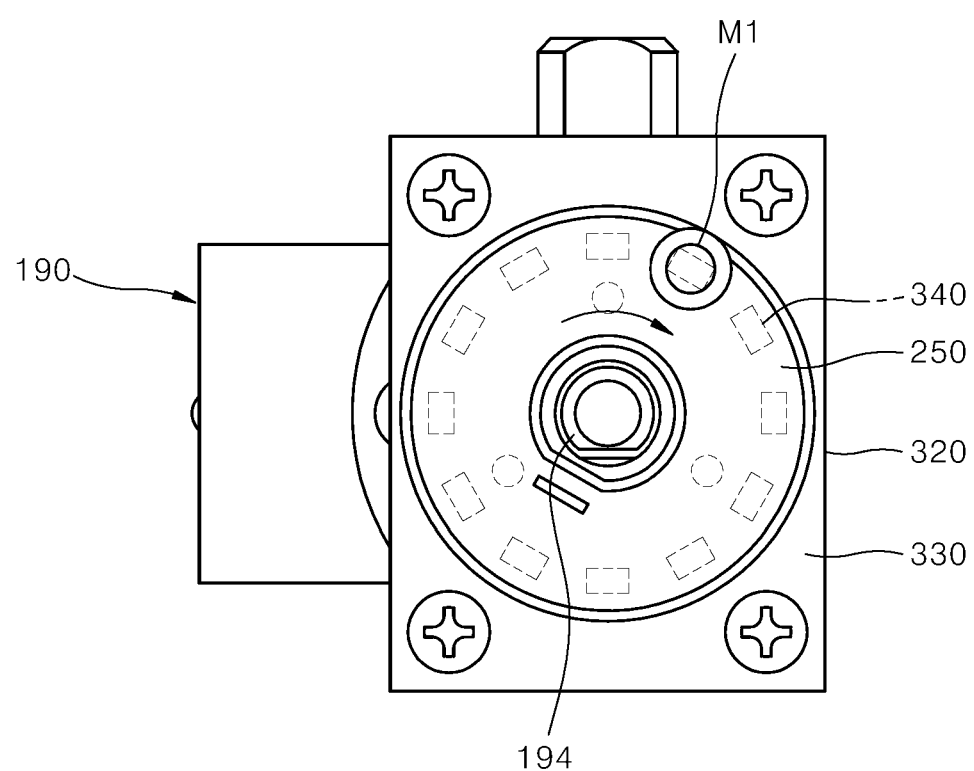
FIG. 14 is a view illustrating an example state in which a position of the first sensing object illustrated in FIG. 13 is changed.

FIG. 11 is a perspective view illustrating a portion of the knob assembly according to one implementation of the present disclosure, and FIG. 12 is a perspective view illustrating the knob assembly illustrated in FIG. 11 in a different direction. FIG. 13 is a view schematically illustrating configurations of a first sensing object and a first rotation sensing part according to one implementation of the present disclosure, and FIG. 14 is a view illustrating a state in which a position of the first sensing object illustrated in FIG. 13 is changed.

Referring to FIGS. 11 and 12, a knob assembly according to the present implementation may further include a configuration for sensing a rotating manipulation of a knob 110 and a rotating manipulation of a knob ring 120.

According to the present implementation, a first sensing object M1 and a first rotation sensing part 300 are disposed as configurations for sensing the rotating manipulation of the knob 110, and a second sensing object M2 (see FIG. 15) and a second rotation sensing part 350 are disposed as configurations for sensing the rotating manipulation of the knob ring 120. In some implementations, the first sensing object M1 may be referred to as a first sensing target.

First, configurations of the first sensing object M1 and the first rotation sensing part 300 will be described with reference to FIGS. 11 to 13. The first sensing object M1 is provided such that a position thereof is changed by interlocking with rotation of the adjusting shaft 194, and the first rotation sensing part 300 senses rotation of the adjusting shaft 194 by sensing a change in position of the first sensing object M1, and from this, senses rotation of the knob 110 connected to the adjusting shaft 194.

The first sensing object M1 is a configuration that becomes a sensing object of the first rotation sensing part 300, and is installed on the adjusting shaft 194. In some examples, a rotary plate 250 is installed at the adjusting shaft 194, and the first sensing object M1 is installed at the rotary plate 250.

According to this, the rotary plate 250 is provided in the form of a disc having a center through which the adjusting shaft 194 passes. The rotary plate 250 may be coupled to an outer peripheral surface of the adjusting shaft 194 and be rotated along with the adjusting shaft 194 about the adjusting shaft 194 when the adjusting shaft 194 is rotated.

The first sensing object M1 is installed at the rotary plate 250, and is installed to be disposed at one side surface of the rotary plate 250 facing the first rotation sensing part 300. A position of the first sensing object M1 installed as above may be changed by the first sensing object M1 being rotated along with the adjusting shaft 194 about the adjusting shaft 194 when the adjusting shaft 194 is rotated.

In some examples, the first sensing object M1 is disposed at a position adjacent to an outer peripheral surface of the rotary plate 250. A position of the first sensing object M1 disposed at the above position may be changed by drawing a trajectory similar to the shape of the outer peripheral surface of the rotary plate 250 when the adjusting shaft 194 is rotated.

The first rotation sensing part 300 is provided to sense a change in position of the first sensing object M1, and is disposed between the first sensing object M1 and the valve assembly 190.

In some examples, the first rotation sensing part 300 may include a supporter 310, a case 320, a substrate 330, and a sensor.

The supporter 310 may be coupled to the valve assembly 190. For example, the supporter 310 may be coupled to the case 320 to support the case 320. The substrate 330 connected to a controller of an appliance is installed at the case 320, and the sensor configured to sense a change in position of the first sensing object M1 is installed at the substrate 330.

The first rotation sensing part 300 having the above configuration senses a position of the first sensing object M1 by a non-contact method. For this, the first sensing object M1 may include a magnetic member configured to generate a magnetic force, and the first rotation sensing part 300 may include a Hall sensor 340 configured to sense a magnetic force of a magnetic member within a predetermined distance from the first rotation sensing part 300. The Hall sensor 340 is installed at the substrate 330. When a magnetic member is within a predetermined distance from the Hall sensor 340, the Hall sensor 340 may sense a magnetic force of the magnetic member and generate a signal corresponding to the sensed magnetic force.

According to the present implementation, the first rotation sensing part 300 includes a plurality of Hall sensors 340, and the plurality of Hall sensors 340 are arranged to be spaced apart at predetermined intervals along a rotation path of the first sensing object M1.

That is, when the first sensing object M1 is rotated by drawing a circular trajectory similar to the shape of the outer peripheral surface of the rotary plate 250 when the adjusting shaft 194 is rotated, the plurality of Hall sensors 340 are disposed to form a circular shape corresponding to a rotation trajectory of the first sensing object M1 in the first rotation sensing part 300.

In the case of a cooking appliance, when a knob 110 is rotated to adjust an opening amount of a valve, an adjusting shaft 194 may be rotated by interlocking with rotation of the knob 110, and an operation for adjusting the opening amount of the valve may be performed by the rotation of the adjusting shaft 194 performed as above.

For example, when the knob 110 is rotated from an initial position by a predetermined angle, gas may start to be supplied through a valve, and when the knob 110 is further rotated from the predetermined angle, the amount of gas supplied through the valve may increase or decrease.

In some examples of appliances other than a cooking appliance, such as a washing machine, a dryer, a dishwasher, or the like, a knob 110 may be manipulated to adjust a speed or strength of operation performed by the appliance or select a type of operation.

The case in which the adjusting shaft 194 is rotated by the knob 110, and the opening amount of the valve is physically adjusted by rotation of the adjusting shaft 194 will be described below as an example.

According this, the adjusting shaft 194 rotated by the knob 110 rotates a component provided for adjusting an opening amount of a valve inside the valve assembly 190 to adjust the opening amount of the valve.

The rotary plate 250 is rotated along with the adjusting shaft 194 rotated as above, and a position of the first sensing object M1 is changed by interlocking with such rotation of the rotary plate 250.

That is, the position of the first sensing object M1 may be changed as much as a change in the opening amount of the valve, and such change in position of the first sensing object M1 is sensed by the first rotation sensing part 300.

For example, when a total of twelve Hall sensors 340 are arranged at equal intervals in the first rotation sensing part 300, when the knob 110 is rotated 30° from an initial position, the position of the first sensing object M1, which was disposed closest to any one of the twelve Hall sensors 340 (hereinafter referred to as "zeroth Hall sensor") when at an initial position, is changed such that, as illustrated in FIG. 14, the first sensing object M1 is located close to another Hall sensor (hereinafter referred to as "first Hall Sensor") next to the zeroth Hall sensor 340. Accordingly, the first sensing object M1 is sensed by the first Hall sensor 340, the first Hall sensor 340 is turned on, and a signal corresponding thereto is generated by the first Hall sensor 340.

For example, when the knob 110 is rotated 30° from the above state, a position of the first sensing object M1 is changed such that the first sensing object M1 is disposed close to another Hall sensor (hereinafter referred to as "second Hall sensor") next to the first Hall sensor 340. Accordingly, the first sensing object M1 is sensed by the second Hall sensor 340, the second Hall sensor 340 is turned on, and a signal corresponding thereto is generated by the second Hall sensor 340.

In some examples, the first rotation sensing part 300 includes the plurality of Hall sensors 340, and the Hall sensors disposed at different positions generate different types of signals. That is, all of a signal generated by the zeroth Hall sensor 340, a signal generated by the first Hall sensor 340, and a signal generated by the second Hall sensor 340 may be different from each other.

The signals generated by the Hall sensors 340 as above may provide information, which is output through the display device 123 (see FIG. 2), such as a level of heating power, a speed or strength of operation, a type of operation, and the like. Based on the information displayed on the display device 123, a user may recognize a state of the knob and a state of the appliance.

For example, from a signal generated by the first Hall sensor 340, it may be recognized that the knob 110 is manipulated to provide a first level of heating power, which is the weakest heating power, and the information recognized as above may be output in the form of text, drawing, or color on the display device 123.

[Structures of Second Sensing Object and Second Rotation Sensing Part]

Figure 15:
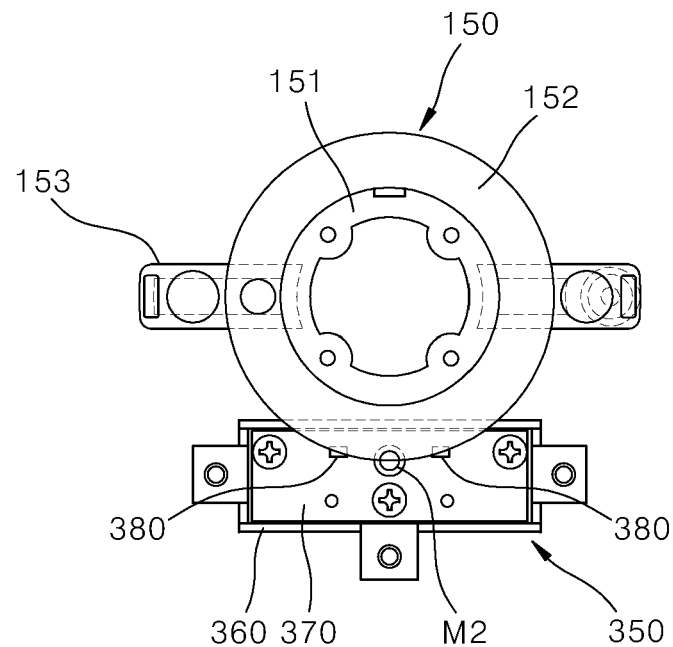
FIG. 15 is a schematic view illustrating a configuration of an example second sensing object and an example second rotation sensing part.
Figure 16:
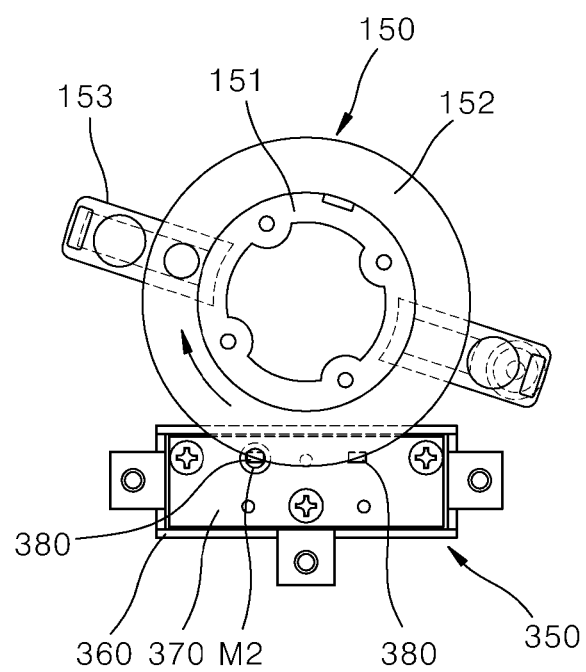
FIG. 16 is a view illustrating an example state in which a position of the second sensing object illustrated in FIG. 15 is changed.

FIG. 15 is a view schematically illustrating configurations of a second sensing object and a second rotation sensing part according to one implementation of the present disclosure, and FIG. 16 is a view illustrating a state in which a position of the second sensing object illustrated in FIG. 15 is changed.

Referring to FIGS. 11, 12, and 15, a second sensing object M2 is provided such that a position thereof is changed by interlocking with rotation of the actuating ring 150, and the second rotation sensing part 350 senses rotation of the actuating ring 150 by sensing a change in position of the second sensing object M2, and from this, senses rotation of the knob ring 120 connected to the actuating ring 150.

The second sensing object M2 is a configuration that becomes a sensing object of the second rotation sensing part 350, and is installed on the actuating ring 150. In some examples, the second sensing object M2 is installed at the flange part 152 of the actuating ring 150. In some implementations, the second sensing object M2 may be referred to as a second sensing target.

The second sensing object M2 is installed on the flange part 152, and is installed to be disposed at one side surface of the flange part 152 facing the second rotation sensing part 350. A position of the second sensing object M2 installed as above may be changed by the second sensing object M2 being rotated along with the actuating ring 150 when the actuating ring 150 is rotated.

In some examples, the second sensing object M2 is disposed at a position adjacent to an outer peripheral surface of the flange part 152. A position of the second sensing object M2 disposed at the above position may be changed by drawing a trajectory similar to the shape of the outer peripheral surface of the flange part 152, which has a circular shape, when the actuating ring 150 is rotated.

The second rotation sensing part 350 is provided to sense a change in position of the second sensing object M2, and is disposed between the second sensing object M2 and the valve assembly 190, for example, between the second sensing object M2 and the first sensing object M1.

For example, the second rotation sensing part 350 may include a case 360, a substrate 370, and a sensor.

The case 360 is installed to be fixed to the support frame 140, for example, to a lower side of the frame main body part 141, and the substrate 370 connected to a controller of an appliance is installed at the case 360.

In some examples, the substrate 370 is installed at the case 360, and is installed at sides facing the frame main body part 141 and the second sensing object M2. The sensor configured to sense a change in position of the second sensing object M2 is installed at the substrate 370.

The second rotation sensing part 350 having the above configuration senses a position of the second sensing object M2 by a non-contact method, like the first rotation sensing part 300. For this, the second sensing object M2 may include a magnetic member configured to generate a magnetic force, and the second rotation sensing part 350 may include a Hall sensor 380 configured to sense a magnetic force of a magnetic member within a predetermined distance from the second rotation sensing part 350. The Hall sensor 380 is installed at the substrate 370. When a magnetic member is within a predetermined distance from the Hall sensor 380, the Hall sensor 380 may sense a magnetic force of the magnetic member and generate a signal corresponding to the sensed magnetic force.

According to the present implementation, the second rotation sensing part 350 includes a plurality of Hall sensors 380, and the plurality of Hall sensors 380 are arranged to be spaced apart at predetermined intervals along a rotation path of the second sensing object M2.

That is, when the second sensing object M2 is rotated by drawing a circular trajectory similar to the shape of the outer peripheral surface of the flange part 152 when the actuating ring 150 is rotated, the plurality of Hall sensors 380 are disposed to form an arc shape corresponding to a rotation trajectory of the second sensing object M2 in the second rotation sensing part 350.

In some examples, a pair of Hall sensors 380 are disposed in the second rotation sensing part 350, and the Hall sensors 380 and the second sensing object M2 are disposed such that the second sensing object M2 is disposed between the pair of Hall sensors 380 when the knob ring 120 and the actuating ring 150 are at initial positions.

According to this, when the knob ring 120 is rotated in one direction, the second sensing object M2 comes close to any one of the pair of Hall sensors 380 (hereinafter referred to as "left Hall sensor") within a predetermined distance, and the corresponding Hall sensor 380 senses the second sensing object M2. When the knob ring 120 is rotated in the other direction, the second sensing object M2 comes close to the other one of the pair of Hall sensors 380 (hereinafter referred to as "right Hall sensor") within a predetermined distance, the corresponding Hall sensor 380 senses the second sensing object M2.

When the knob ring 120 is disposed to provide a timer function, when the knob ring 120 is rotated in one direction, the second sensing object M2 comes close to the left Hall sensor 380 within a predetermined distance, and the left Hall sensor 380 senses the second sensing object M2. Accordingly, manipulation of the knob ring 120 for starting timer operation may be sensed by the second rotation sensing part 350, and a timer may be operated (see FIG. 16).

When the knob ring 120 is rotated in the other direction, the second sensing object M2 comes close to the right Hall sensor 380 within a predetermined distance, and the right Hall sensor 380 senses the second sensing object M2. Accordingly, manipulation of the knob ring 120 for starting timer operation may be sensed by the second rotation sensing part 350, and a timer may be operated.

In some examples, different types of signals are generated by different Hall sensors 380. That is, a signal generated by the left Hall sensor 380 and a signal generated by the right Hall sensor 380 are different from each other.

Using this, a function of the knob ring 120 may be configured so that time of a timer is differently set according to rotating directions of the knob ring 120, or a function of the knob ring 120 may be configured so that different functions are provided according to rotating directions of the knob ring 120.

As an example, a function of the knob ring 120 may be configured so that time of a timer is set in units of minutes when the knob ring 120 is rotated in one direction, and time of a timer is set in units of seconds when the knob ring 120 is rotated in the other direction.

As another example, a function of the knob ring 120 may be configured so that a timer is set when the knob ring 120 is rotated in one direction, and setting of the timer is disabled when the knob ring 120 is rotated in the other direction.

As still another example, a function of the knob ring 120 may be configured so that a timer function is provided when the knob ring 120 is rotated in one direction, and a function other than the timer function is provided when the knob ring 120 is rotated in the other direction.

The signals generated by the Hall sensors 380 may be provided as fundamental information for recognizing information output by the display device 123 (see FIG. 2).

For example, using a signal generated by the left Hall sensor 380 as fundamental information, information such as whether timer operation is started and time of a timer may be recognized, and the information recognized as above may be output in the form of text, drawing, or color on the display device 123.

[Actions and Effects of Structures for Sensing Rotations of Knob and Knob Ring]

Referring to FIGS. 11 and 12, rotation of the knob 110 may be sensed by a non-contact method using the first sensing object M1 and the first rotation sensing part 300, and rotation of the knob ring 120 may be sensed by a non-contact method using the second sensing object M2 and the second rotation sensing part 350.

In this case, the centers of rotation of the first sensing object M1 and the second sensing object M2 are arranged in a row along a single axis, for example, along the adjusting shaft 194. The first rotation sensing part 300 provided to sense a position of the first sensing object M1 is also disposed on the same axis, and the centers of rotation of the first sensing object M1 and the second sensing object M2 and the first rotation sensing part 300 are arranged in a row along the single axis.

To design a structure of a knob assembly in the form in which the above are arranged in a row along the adjusting shaft 194, transmission of a rotary force for adjusting an opening amount of a valve and transmission of a rotary force for changing a position of the first sensing object M1 should be performed by the single adjusting shaft 194, and the first rotation sensing part 300 should be able to pass the adjusting shaft 194 therethrough and effectively sense a change in a position of the first sensing object M1. In some examples, the second sensing object M2 is rotated, and the adjusting shaft 194 may pass through the actuating ring 150.

According to the present implementation, from the knob 110, the adjusting shaft 194 may sequentially pass through the actuating ring 150, the rotary plate 250 on which the first sensing object M1 is installed, and the first rotation sensing part 300 to be connected to the valve assembly 190 to transmit a rotary force for adjusting an opening amount of a valve to the valve assembly 190. The adjusting shaft 194, which is installed to connect between the knob 110 and the valve assembly 190 as above, is also rotated to transmit the rotary force for adjusting the opening amount of the valve such that the position of the first sensing object M1 is also changed.

That is, just by having the single adjusting shaft 194, all of shaft actions necessary for transmitting a rotary force for adjusting an opening amount of a valve and shaft actions necessary for sensing a rotary position of the knob 110 may be provided.

Other designs for the structure may be possible because rotation of the knob 110 is sensed by a non-contact method with a combination of the first sensing object M1 and the first rotation sensing part 300.

In some cases, to transmit a rotary force for adjusting an opening amount of a valve, a physical connection between the adjusting shaft 194 and the valve may be required. For example, when a rotation sensing device is configured such that physical connection with the adjusting shaft 194 is necessary to sense rotation of the knob 110, an additional power transmission structure may be provided to transmit a rotary force of the adjusting shaft 194 to the rotation sensing device.

For example, when a rotation sensing device for sensing rotation of the knob 110 is configured in the form including an encoder, a separate rotating shaft for transmitting a rotary force of the adjusting shaft 194 to the encoder and gears configured to connect between the rotating shaft and the adjusting shaft 194 may be added.

In some cases, when the power transmission structure including a separate rotating shaft and gears as above is added, the number of components and assembly processes may increase, a manufacturing cost may increase, and a level of difficulty of a manufacturing task may increase due to addition of a complicated process for satisfaction on gear backlash. In some cases, when the power transmission structure is repeatedly used, an error in a sensed result may be increased due to wear of gears, changes in engagement states of the gears, etc.

In comparison to the above, in the rotation sensing structure of the knob 110 of the present implementation, rotation of the knob 110 is sensed by a non-contact method, and all of shaft actions necessary for transmitting a rotary force for adjusting an opening amount of a valve and shaft actions necessary for sensing a rotary position of the knob 110 may be provided. Thus, an additional power transmission structure for transmitting a rotary force of the adjusting shaft 194 to a sensing device is not required.

Since rotation of the knob ring 120 is also sensed by a non-contact method in a structure for sensing rotation of the knob ring 120 of the present implementation, an additional power transmission structure for transmitting rotation of the knob ring 120 to a sensing device is not required.

Therefore, according to the knob assembly and the appliance having the same described in this application, a function in which a physical power transmission operation through manipulation of the knob 110 and a sensing operation for sensing manipulation of the knob 110 are simultaneously performed can be provided, an increase in the number of components, assembly processes, and manufacturing costs necessary for implementing such a function can be suppressed, a manufacturing task can be more easily performed, and performance of sensing manipulations of manipulation switches such as the knob 110 and the knob ring 120 can be effectively improved.

In some implementations, an independent manipulation switch whose function and shape are different from those of a conventional knob ring is provided using a knob ring installed to finish a knob. In some examples, a user can easily select a manipulation switch suitable for a certain purpose such that convenience in use is improved, and the number of manipulation switches disposed at a front surface of the appliance is decreased such that an appearance of the front surface of the appliance is improved.

In some implementations, a function in which a physical power transmission operation through manipulation of a knob and a sensing operation for sensing manipulation of the knob are simultaneously performed can be provided, an increase in the number of components, assembly processes, and manufacturing costs necessary for implementing such a function can be suppressed, a manufacturing task can be more easily performed, and performance of sensing manipulations of manipulation switches such as a knob and a knob ring can be effectively improved.

Although the present disclosure has been described above with reference to implementations illustrated in the drawings, this is merely illustrative, and those of ordinary skill in the art to which the present disclosure pertains should understand that various modifications and other equivalent implementations are possible from the above-described implementations. Therefore, the actual technical scope of the present disclosure should be defined by the claims below.

What is claimed is:

1. A knob assembly for an appliance, the knob assembly comprising:
 a knob that is configured to be arranged at a front panel of the appliance, and that is configured to rotate about an axis to control a first function of the appliance;
 a knob ring that is configured to be arranged annularly around the knob, and that is configured to rotate about the axis independently of rotation of the knob to control a second function of the appliance that is different from the first function;
 a first rotation sensing part configured to sense rotation of the knob; and
 a display device that is disposed at the knob ring, and that is configured to display information,
 wherein the display device is configured to output a first result value indicating a rotation of the knob sensed by the first rotation sensing part.

2. The knob assembly of claim 1, wherein the display is disposed radially outer position with respect to an outer peripheral surface of the knob.

3. The knob assembly of claim 1, wherein the knob ring is disposed at an outer peripheral surface of the knob, and the display is protruded radially from the knob ring.

4. The knob assembly of claim 1, wherein the knob ring has an outer diameter greater than that of the knob, and the display is radially more protruded than the outer diameter of the knob ring.

5. The knob assembly of claim 1, further comprising a second rotation sensing part configured to sense rotation of the knob ring,
wherein the display device is configured to output a second result value indicating a rotation of the knob ring sensed by the second rotation sensing part.

6. The knob assembly of claim 5, wherein the knob ring is configured to be rotated by a predetermined angle from an initial position in clockwise and counterclockwise directions.

7. The knob assembly of claim 6, wherein the knob ring is configured, based on the knob ring being rotated by a user from the initial position, to return to the initial position upon release of the knob ring by the user.

8. The knob assembly of claim 6, further comprising a second rotary member that is configured to rotate based on rotation of the knob ring, and that comprises a second sensing target,
wherein a position of the second sensing target changes based on rotation of the second rotary member, and
wherein the second rotation sensing part senses whether the knob ring is rotated by the predetermined angle from the initial position in clockwise or counterclockwise directions or not by sensing the second sensing target in a state that the knob ring is rotated by the predetermined angle from the initial position in clockwise or counterclockwise directions.

9. The knob assembly of claim 8, wherein the second sensing target comprises a magnetic member configured to generate magnetic force, and
wherein the second rotation sensing part comprises a Hall sensor configured to sense magnetic force generated by the magnetic member.

10. The knob assembly of claim 6, further comprising a second rotary member that is configured to rotate based on rotation of the knob ring, and that comprises a second sensing target,
wherein a position of the second sensing target changes based on rotation of the second rotary member, and
wherein the second rotation sensing part is configured to sense the position or the amount of change of the position of the second sensing target without contacting the second sensing target.

11. The knob assembly of claim 6, further comprising a second rotary member that is configured to rotate based on rotation of the knob ring, and that comprises a second sensing target,
wherein a position of the second sensing target changes based on rotation of the second rotary member,
wherein the second rotation sensing part is configured to sense the position or the change of the position of the second sensing target, and
wherein the second rotation sensing part comprises a plurality of Hall sensors that are each configured to generate a signal based on detection of magnetic force, and that are arranged at intervals along a rotation path of the second sensing target.

12. The knob assembly of claim 1, further comprising a rotary member that is configured to rotate according to rotation of the knob, and that comprises a first sensing target,
wherein a position of the first sensing target changes based on rotation of the rotary member,
wherein the first rotation sensing part is further configured to sense at least one of the position or an amount of change of the position of the first sensing target.

13. The knob assembly of claim 12, wherein the first sensing target comprises a magnetic member configured to generate magnetic force, and
wherein the first rotation sensing part comprises a Hall sensor configured to sense magnetic force within a first distance from the Hall sensor.

14. The knob assembly of claim 13, wherein the first rotation sensing part comprises a plurality of Hall sensors that are each configured to generate a signal based on detection of magnetic force and that are arranged at intervals along a rotation path of the first sensing target.

15. The knob assembly of claim 14, wherein the plurality of Hall sensors comprise a first Hall sensor located at a first position at the first rotation sensing part, and a second Hall sensor located at a second position that is different from the first position, and
wherein the first Hall sensor is configured to generate a first type of signal, and the second Hall sensor is configured to generate a second type of signal that is different from the first type of signal.

16. An appliance comprising:
a front panel; and
a knob assembly located at the front panel, the knob assembly comprising:
a knob located at a front panel of the appliance and configured to rotate about an axis to control a first function of the appliance,
a knob ring that is located at the front panel annularly around the knob, and configured to rotate about the axis independently of rotation of the knob to control a second function of the appliance that is different from the first function,
a first rotation sensing part configured to sense rotation of the knob,
a display device that is disposed at the knob ring, and that is configured to display information,
wherein the display device is configured to output a first result value indicating a rotation of the knob sensed by the first rotation sensing part.

17. The appliance of claim 16, wherein the display is disposed radially outer position with respect to an outer peripheral surface of the knob.

18. The appliance of claim 16, wherein the knob ring is disposed at an outer peripheral surface of the knob, and the display is protruded radially from the knob ring.

19. The appliance of claim 16, wherein the knob ring has an outer diameter greater than that of the knob, and the display is radially more protruded than the outer diameter of the knob ring.

20. The appliance of claim 16, further comprising a second rotation sensing part configured to sense rotation of the knob ring,
wherein the display device is configured to output a second result value indicating a rotation of the knob ring sensed by the second rotation sensing part.

* * * * *